United States Patent
Paller

(10) Patent No.: US 11,297,840 B2
(45) Date of Patent: Apr. 12, 2022

(54) OVEN APPLIANCE COMBUSTION CHAMBER

(71) Applicant: Haier US Appliance Solutions, Inc., Wilmington, DE (US)

(72) Inventor: Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 203 days.

(21) Appl. No.: 16/437,268

(22) Filed: Jun. 11, 2019

(65) Prior Publication Data

US 2020/0390111 A1    Dec. 17, 2020

(51) Int. Cl.
*A21B 1/28*    (2006.01)
*F24C 15/32*    (2006.01)
*A21B 3/04*    (2006.01)
*A21B 1/26*    (2006.01)

(52) U.S. Cl.
CPC ............... *A21B 1/28* (2013.01); *A21B 1/26* (2013.01); *A21B 3/04* (2013.01); *F24C 15/32* (2013.01)

(58) Field of Classification Search
CPC .... A21B 3/04; A21B 1/26; A21B 1/28; F24C 15/32; F24C 3/087
USPC ........................................................ 126/21 r
See application file for complete search history.

(56) References Cited

U.S. PATENT DOCUMENTS

| 6,761,159 | B1* | 7/2004 | Barnes | F24C 15/2007 126/21 R |
| 6,880,544 | B2 | 4/2005 | Hegge et al. | |
| 2020/0309380 | A1* | 10/2020 | Martin | F24C 15/322 |

FOREIGN PATENT DOCUMENTS

WO    WO2018211417    11/2018

* cited by examiner

*Primary Examiner* — Steven B McAllister
*Assistant Examiner* — John E Bargero
(74) *Attorney, Agent, or Firm* — Dority & Manning, P.A.

(57) ABSTRACT

An oven appliance includes a cabinet extending vertically between a top portion and a bottom portion. The cabinet defines a cooking chamber configured for receipt of food items for cooking. The oven appliance also includes a combustion heating assembly. The combustion heating assembly includes a tubular combustion chamber extending from an inlet to an outlet. The outlet of the tubular combustion chamber is in thermal communication with the cooking chamber to provide combustion gas from the tubular combustion chamber to the cooking chamber. The combustion heating assembly also includes a burner in fluid communication with the tubular combustion chamber via the inlet of the tubular combustion chamber. Combustion products from the burner mix with secondary air within the tubular combustion chamber to produce the combustion gas.

20 Claims, 5 Drawing Sheets

OVEN APPLIANCE COMBUSTION CHAMBER

FIELD OF THE INVENTION

The present subject matter relates generally to oven appliances, and more particularly to oven appliances including a combustion heating element.

BACKGROUND OF THE INVENTION

Oven appliances generally include a cabinet that defines a cooking chamber for cooking food items therein, such as by baking or broiling the food items. To heat the cooking chamber for cooking, oven appliances include one or more heating elements positioned in the cooking chamber, such as at a top portion, bottom portion, side portion, or combinations thereof, in the cooking chamber. Some oven appliances also include a convection heating element and fan for convection cooking cycles. The heating element or elements may be used for various cycles of the oven appliance, such as a preheat cycle, a cooking cycle, or a self-cleaning cycle.

Some oven appliances include a gas-powered heating element, e.g., a gas burner which combusts a gaseous fuel, to generate heat for heating the cooking chamber. Typically, the gas heating element or burner is open to the interior of the cooking chamber or is positioned below a bottom wall of the cooking chamber. Such configurations may result in less than ideal mixing of gas and air to accomplish complete combustion.

Accordingly, gas heating elements for oven appliances which provide improved combustion in a compact fashion are desired.

BRIEF DESCRIPTION OF THE INVENTION

Aspects and advantages of the invention will be set forth in part in the following description, or may be apparent from the description, or may be learned through practice of the invention.

In one exemplary embodiment, the present subject matter is directed to an oven appliance. The oven appliance defines a vertical direction, a lateral direction and a transverse direction. The vertical, lateral and transverse directions are mutually perpendicular. The oven appliance includes a cabinet extending between a front portion and a back portion along the transverse direction. The cabinet also extends between a first side portion and a second side portion along the lateral direction and between a top portion and a bottom portion along the vertical direction. The cabinet defines a cooking chamber configured for receipt of food items for cooking. The oven appliance also includes a tubular combustion chamber extending from an inlet to an outlet. The outlet of the tubular combustion chamber is in thermal communication with the cooking chamber to provide combustion gas from the tubular combustion chamber to the cooking chamber. A burner is positioned proximate the inlet of the tubular combustion chamber. The burner is in thermal communication with the tubular combustion chamber such that combustion products from the burner enter the tubular chamber at the inlet. The burner is spaced from the inlet of the tubular combustion chamber such that secondary air is entrained into the inlet of the tubular combustion chamber and drawn through the tubular combustion chamber by the combustion products from the burner.

In another exemplary embodiment, an oven appliance is provided. The oven appliance includes a cabinet extending vertically between a top portion and a bottom portion. The cabinet defines a cooking chamber configured for receipt of food items for cooking. The oven appliance also includes a combustion heating assembly. The combustion heating assembly includes a tubular combustion chamber extending from an inlet to an outlet. The outlet of the tubular combustion chamber is in thermal communication with the cooking chamber to provide combustion gas from the tubular combustion chamber to the cooking chamber. The combustion heating assembly also includes a burner in fluid communication with the tubular combustion chamber via the inlet of the tubular combustion chamber. Combustion products from the burner mix with secondary air within the tubular combustion chamber to produce the combustion gas.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
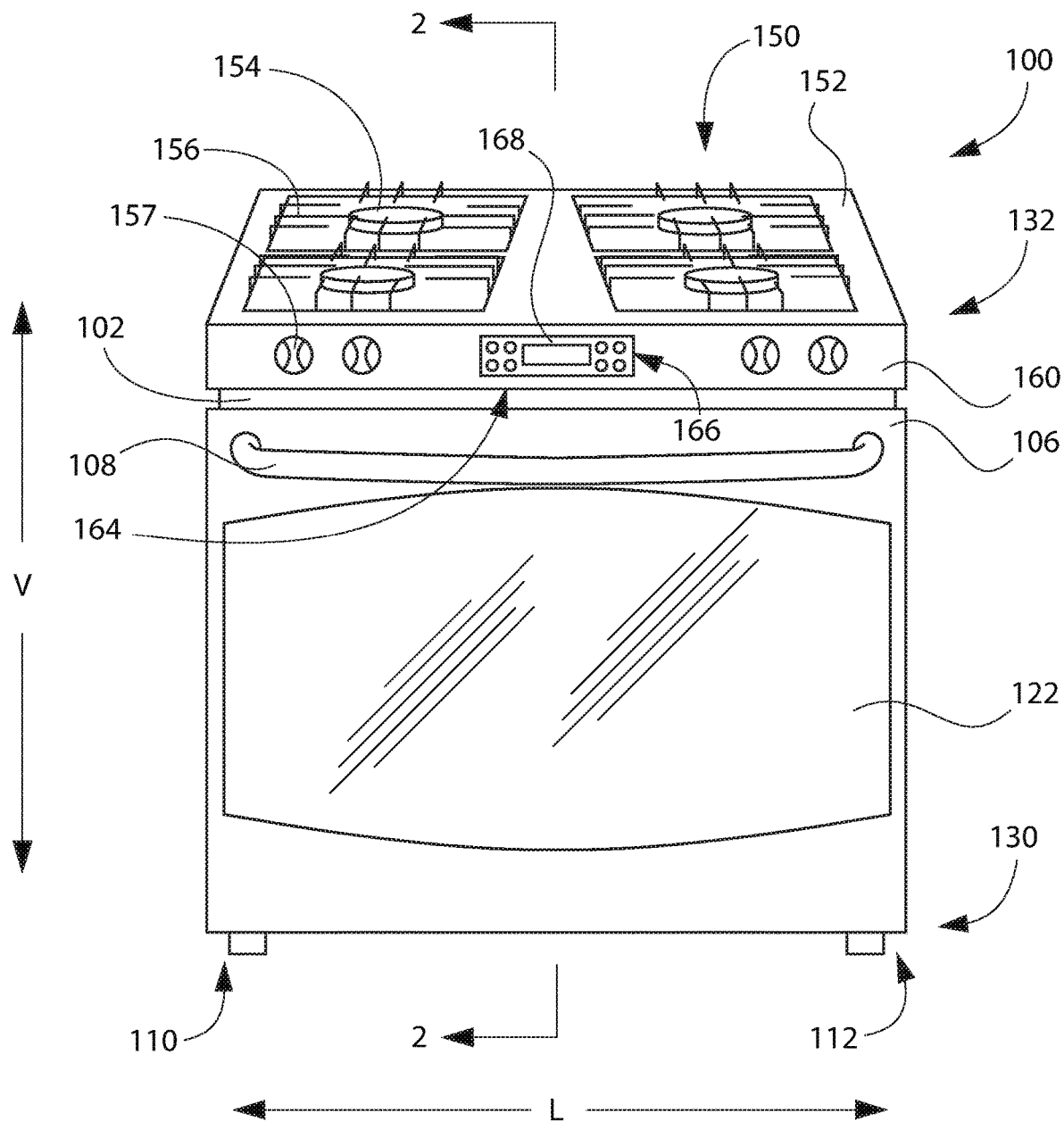
FIG. 1 provides a perspective view of an oven appliance according to one or more exemplary embodiments of the present subject matter.

Reference now will be made in detail to embodiments of the invention, one or more examples of which are illustrated in the drawings. The detailed description uses numerical and letter designations to refer to features in the drawings. Like or similar designations in the drawings and description have been used to refer to like or similar parts of the disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
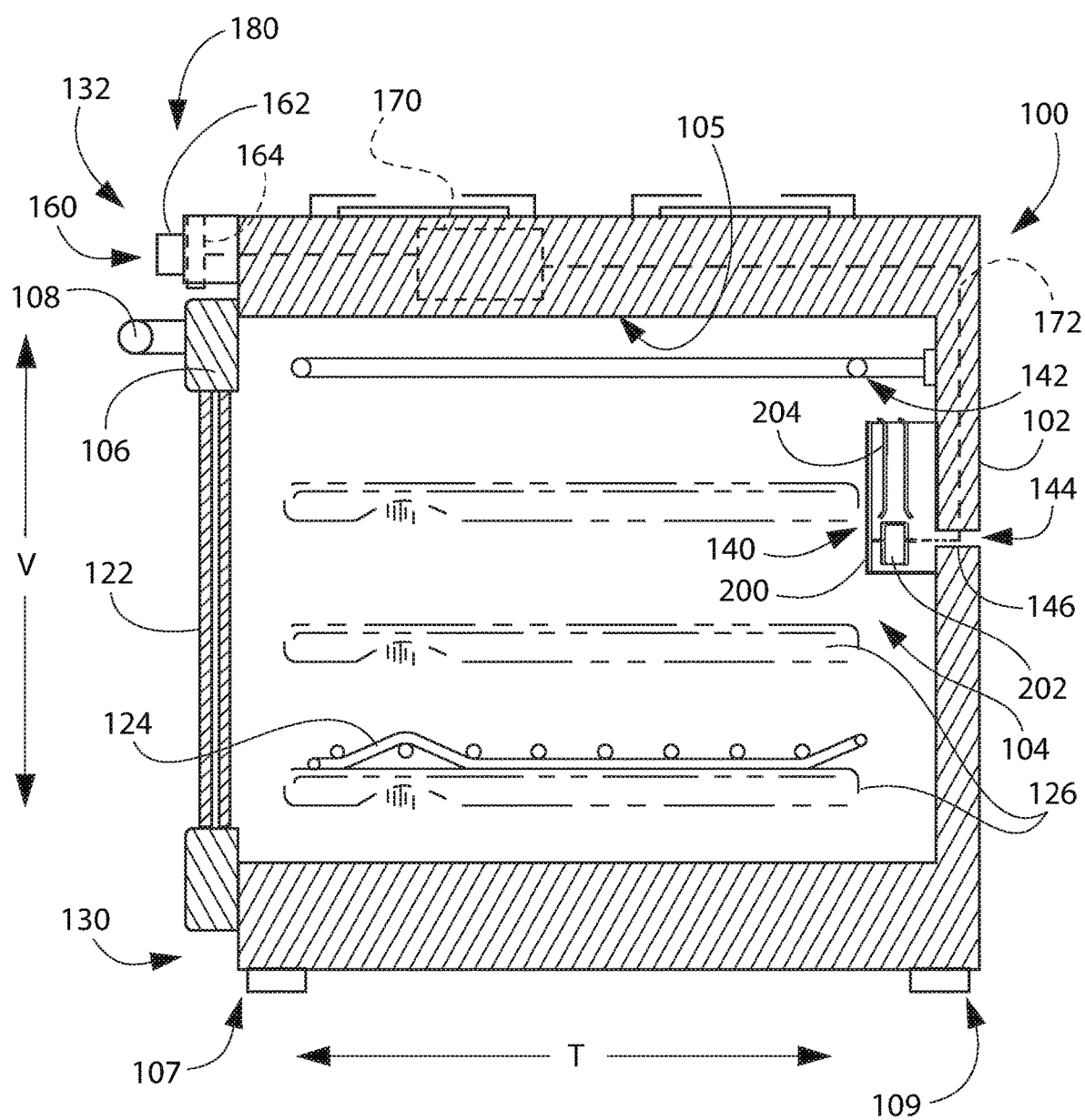
FIG. 2 provides a section view of the oven appliance of FIG. 1 taken along line 2-2 of FIG. 1.

FIG. 1 provides a front perspective view of an oven appliance 100 according to exemplary embodiments of the present subject matter. FIG. 2 provides a section view of exemplary oven appliance 100 taken along line 2-2 of FIG. 1. Oven appliance 100 is shown in FIGS. 1 and 2 as a free-standing range oven appliance, but it will be appreciated that oven appliance 100 is provided by way of example only and is not intended to limit the present subject matter in any aspect. Thus, the present subject matter may be used with other oven appliance configurations, e.g., wall ovens and/or oven appliances that define one or more interior cavities for the receipt of food items and/or having different pan or rack arrangements than what is shown in FIG. 2.

Oven appliance 100 includes an insulated cabinet 102 with an interior cooking chamber 104 defined by an interior surface 105 of cabinet 102. Cooking chamber 104 is configured for receipt of one or more food items to be cooked. Cabinet 102 extends between a bottom portion 130 and a top portion 132 along a vertical direction V. Cabinet 102 also extends between a front portion 107 and a back portion 109 along a transverse direction T and between a first side 110 and a second side 112 along a lateral direction L. Vertical direction V, lateral direction L, and transverse direction T are mutually perpendicular and form an orthogonal direction system.

Oven appliance 100 includes a door 106 rotatably mounted to cabinet 102, e.g., with a hinge (not shown). A handle 108 is mounted to door 106 and assists a user with opening and closing door 106. For example, a user can pull or push handle 108 to open or close door 106 to access cooking chamber 104. Oven appliance 100 includes a seal (not shown) between door 106 and cabinet 102 that maintains heat and cooking fumes within cooking chamber 104 when door 106 is closed as shown in FIGS. 1 and 2. Multiple parallel glass panes 122 provide for viewing the contents of cooking chamber 104 when door 106 is closed and provide insulation for cooking chamber 104. A baking rack 124 is positioned in cooking chamber 104 for receipt of food items or utensils containing food items. Baking rack 124 is slidably received onto embossed ribs or sliding rails 126 such that rack 124 may be conveniently moved into and out of cooking chamber 104 when door 106 is open.

A combustion heating assembly 140 is positioned in cabinet 102. For example, the combustion heating assembly 140 may be positioned within the cooking chamber 104, as illustrated in FIG. 2. In other embodiments, the combustion heating assembly 140 may be positioned outside the cooking chamber 104 and may be in thermal communication with the cooking chamber 104 via one or more ducts, fans, etc. In some embodiments, the combustion heating assembly 104 may be positioned proximate the top portion 132 of the cabinet 102. The combustion heating assembly 104 may be positioned proximate the back portion 109 of the cabinet 102. As described in more detail below, the combustion heating assembly 140 may include a housing 200, a burner 202, and a tubular combustion chamber 204. The heating assembly 140 is used to heat cooking chamber 104 for both cooking and cleaning of oven appliance 100. The size and heat output of heating assembly 140 can be selected based on, e.g., the size of oven appliance 100.

A top heating element or broil element 142 is also positioned in cooking chamber 104 of cabinet 102 proximate top portion 132 of cabinet 102. Top heating element 142 is used to heat cooking chamber 104 for both cooking/broiling and cleaning of oven appliance 100. Like heating assembly 140, the size and heat output of top heating element 142 can be selected based on, e.g., the size of oven appliance 100. In the exemplary embodiment shown in FIG. 2, top heating element 142 is shown as an electric resistance heating element. However, in alternative embodiments, any other suitable heating element may be used instead of electric resistance heating element 142.

As shown in FIG. 1, oven appliance 100 includes a cooktop 150. Cooktop 150 is disposed on and is attached to or integral with cabinet 102. Cooktop 150 includes a top panel 152, which by way of example may be constructed of glass, ceramics, enameled steel, or combinations thereof. One or more burners 154 extend through top panel 152. A utensil (e.g., pots, pans, etc.) holding food and/or cooking liquids (e.g., oil, water, etc.) may be placed onto grates 156 disposed adjacent burners 154. Burners 154 provide thermal energy to cooking utensils placed on grates 156. Burners 154 can be any suitable type of burners, including e.g., gas, electric, electromagnetic, a combination of the foregoing, etc. It will be appreciated that the configuration of cooktop 150 is provided by way of example only and that other suitable configurations are contemplated.

Oven appliance 100 includes a user interface panel 160. For this exemplary embodiment, user interface panel 160 includes a number of knobs 162 that each correspond to one of the burners 154. Knobs 162 allow users to activate each burner 154 and to determine the amount of heat input provided by each burner 154 to a cooking utensil located thereon.

User interface panel 160 also includes a control panel 164 that provides visual information to a user and allows the user to select various operational features for the operation of oven appliance 100 via one or more user inputs 166. One or more of a variety of electrical, mechanical or electro-mechanical input devices including rotary dials, push buttons, toggle/rocker switches, and/or touch pads can also be used singularly or in combination as user inputs 166.

A display 168 of control panel 164 may present certain information to users, such as, e.g., whether a particular burner 154 is activated and/or the level at which the burner 154 is set. Display 168 can be a touch sensitive component (e.g., a touch-sensitive display screen or a touch pad) that is sensitive to the touch of a user input object (e.g., a finger or a stylus). Display 168 may include one or more graphical user interfaces that allow for a user to select or manipulate various operational features of oven appliance 100 or its cooktop 150.

Referring now specifically to FIG. 2, the operation of oven appliance 100 is controlled by a processing device or controller 170. As shown, controller 170 is communicatively coupled with control panel 164 and its user inputs 166. Controller 170 may also be communicatively coupled with various operational components of oven appliance 100 as well, such as heating assembly 140, e.g., the burner 202 therein, heating element 142, knobs 162, temperature sensors, cameras, speakers, and microphones, etc. Input/output ("I/O") signals may be routed between controller 170 and the various operational components of oven appliance 100. Thus, controller 170 can selectively activate and operate these various components. Various components of oven appliance 100 are communicatively coupled with controller 170 via one or more communication lines 172, such as, e.g., signal lines, shared communication busses, or wirelessly.

Controller 170 includes one or more memory devices and one or more processors (not labeled). The processors can be any combination of general or special purpose processors, CPUs, or the like that can execute programming instructions or control code associated with operation of oven appliance 100. The memory devices may represent random access memory such as DRAM or read only memory such as ROM or FLASH. In one embodiment, the processor executes programming instructions stored in memory. The memory may be a separate component from the processor or may be included onboard within the processor. Alternatively, controller 170 may be constructed without using a processor, e.g., using a combination of discrete analog and/or digital logic circuitry (such as switches, amplifiers, integrators, comparators, flip-flops, AND gates, and the like) to perform control functionality instead of relying upon software. Controller 170 may include a network interface such that controller 170 can connect to and communicate over one or more networks with one or more network nodes. Controller 170 can also include one or more transmitting, receiving, and/or transceiving components for transmitting/receiving communications with other devices communicatively coupled with oven appliance 100. Additionally or alternatively, one or more transmitting, receiving, and/or transceiving components can be located off board controller 170. Controller 170 can be positioned in a variety of locations throughout oven appliance 100. For this embodiment, controller 170 is located proximate user interface panel 160 toward top portion 132 of oven appliance 100.

Control panel 164, including user inputs 166 and display 168, and knobs 162 collectively make up a user interface 180 of oven appliance 100. User interface 180 provides a means for users to communicate with and operate oven appliance 100. It will be appreciated that other components or devices that provide for communication with oven appliance 100 for operating oven appliance 100 may also be included in user interface. For example, although not shown, user interface 180 may include a speaker, a microphone, a camera or motion detection camera for detecting a user's proximity to oven appliance 100 or for picking up certain motions, and/or other user interface elements in various combinations.

Figure 3:
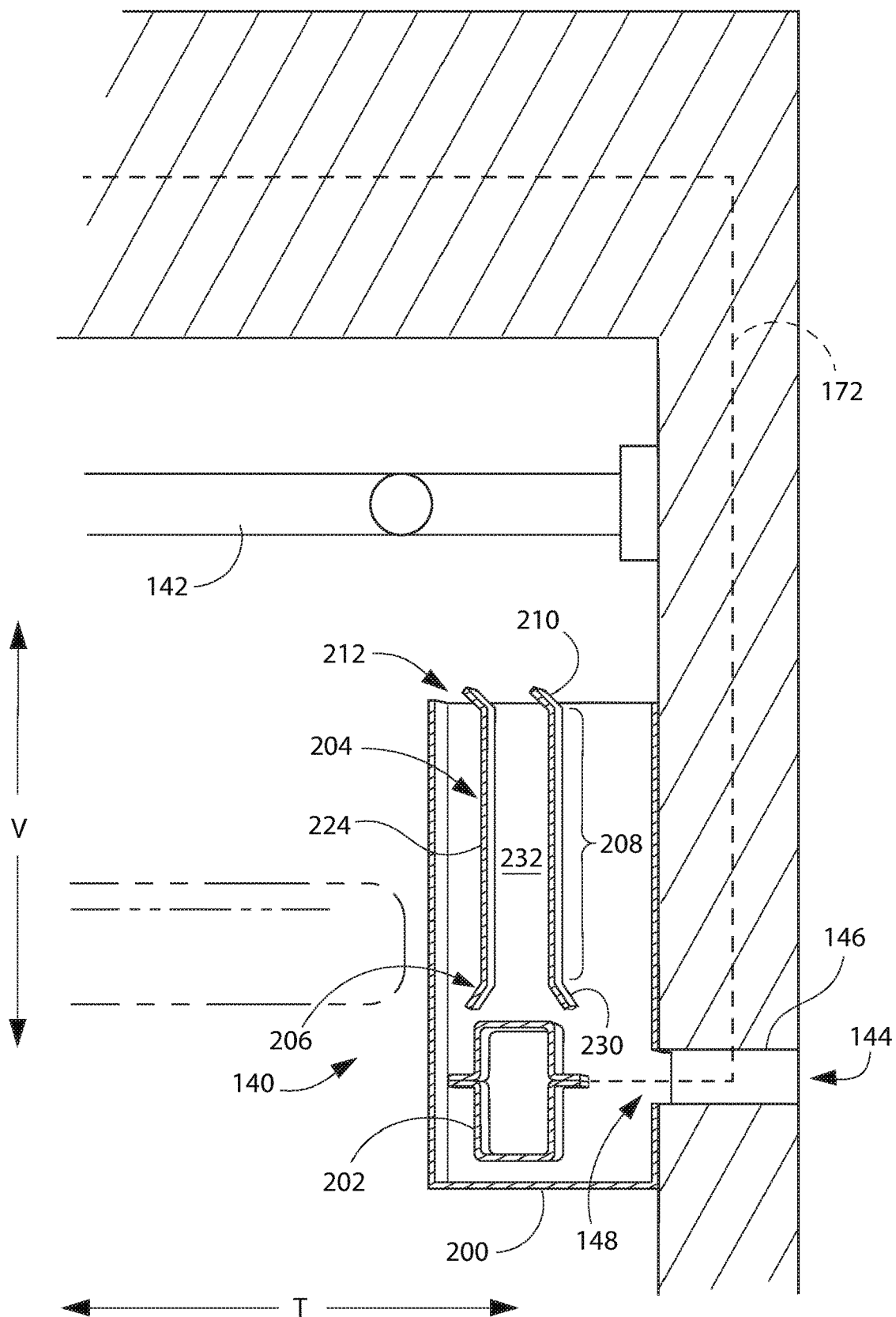
FIG. 3 provides an enlarged view of a portion of FIG. 2.

In some embodiments, e.g., as illustrated in FIGS. 2 and 3, the exemplary combustion heating assembly 140 may include a burner 202 and a tubular combustion chamber 204 disposed within a housing 200. The housing 200 may enclose the burner 202 and the tubular combustion chamber 204 on five sides. One of the five sides, e.g., a back side, may be flush with the inner surface 105 of the cooking chamber 104, e.g., at a back wall of the cooking chamber 104. As may be seen, e.g., in FIG. 3, the housing 200 may include a top portion 212, e.g., proximate to and facing towards the top portion 132 of the cabinet 102, and the housing 200 may be open at the top portion 212. The tubular combustion chamber 204 may extend from an inlet 206 to an outlet 210, e.g., along the vertical direction V. A main body or body portion 208 of the tubular combustion chamber 204 may be defined between the inlet 206 and the outlet 210 and may extend from the inlet 206 to the outlet 210. As will be described in more detail below, the combustion chamber 204 is "tubular" in that the combustion chamber 204 is hollow and defines a flow path for combustion products 500 and secondary air 402 therethrough.

Where the housing 200 is open at the top, the tubular combustion chamber 204 may be partially enclosed within the housing 200. For example, as illustrated in FIG. 3, the outlet 210 may extend out of the housing 200, e.g., above the housing 200 along the vertical direction V. The outlet 210 of the tubular combustion chamber 204 may be in thermal communication with the cooking chamber 104 to provide combustion gas 502 (FIG. 5) from the tubular combustion chamber 204 to the cooking chamber 104. For example, in the illustrated embodiment of FIG. 3, the outlet 210 of the tubular combustion chamber 204 may extend out of the housing 200, whereby combustion gas 502 (FIG. 5) may enter the cooking chamber 104 directly and immediately from the outlet 210 of the cooking chamber 104. In other embodiments, the combustion gas 502 may travel to the cooking chamber 104 through a portion of the housing 200 and/or a duct, etc. For example, in some embodiments, the combustion heating assembly 140 may be positioned outside of the cooking chamber 104 and an air handler, e.g., fan or blower, may be provided to urge the combustion gas 502 into the cooking chamber 104, e.g., the tubular combustion chamber 204 may be in thermal communication with the cooking chamber 104 via a duct and/or fan to provide combustion gas 502 from the tubular combustion chamber 204 to the cooking chamber 104. Such fans, ducts, etc. are understood by those of ordinary skill in the art and, as such, are not illustrated or described in further detail herein for the sake of clarity and concision.

In some embodiments, the housing 200 may be in fluid communication with an ambient environment around the oven appliance 100. For example, as illustrated in FIG. 3, a duct 146 may extend through the cabinet 102. For example, the duct 146 may extend from a vent 144 in the cabinet 102 to an inlet 148 in the housing 200. The duct 146 may provide secondary air 402 (FIG. 5) to the combustion heating assembly 140.

Figure 4:
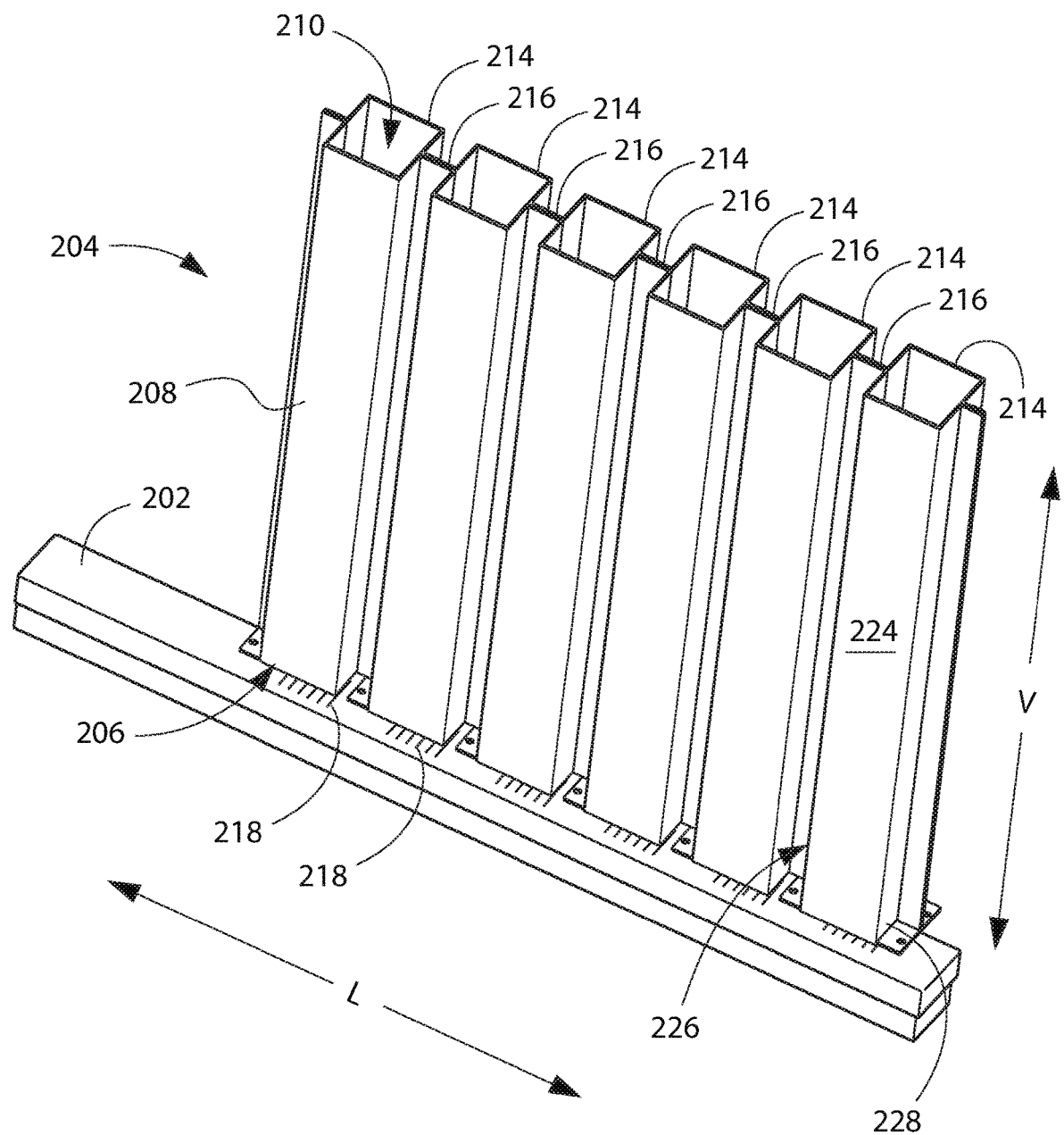
FIG. 4 provides a perspective view of a burner and a tubular combustion chamber according to one or more exemplary embodiments of the present subject matter which may be incorporated into an oven appliance such as the oven appliance of FIGS. 1-3.
Figure 5:
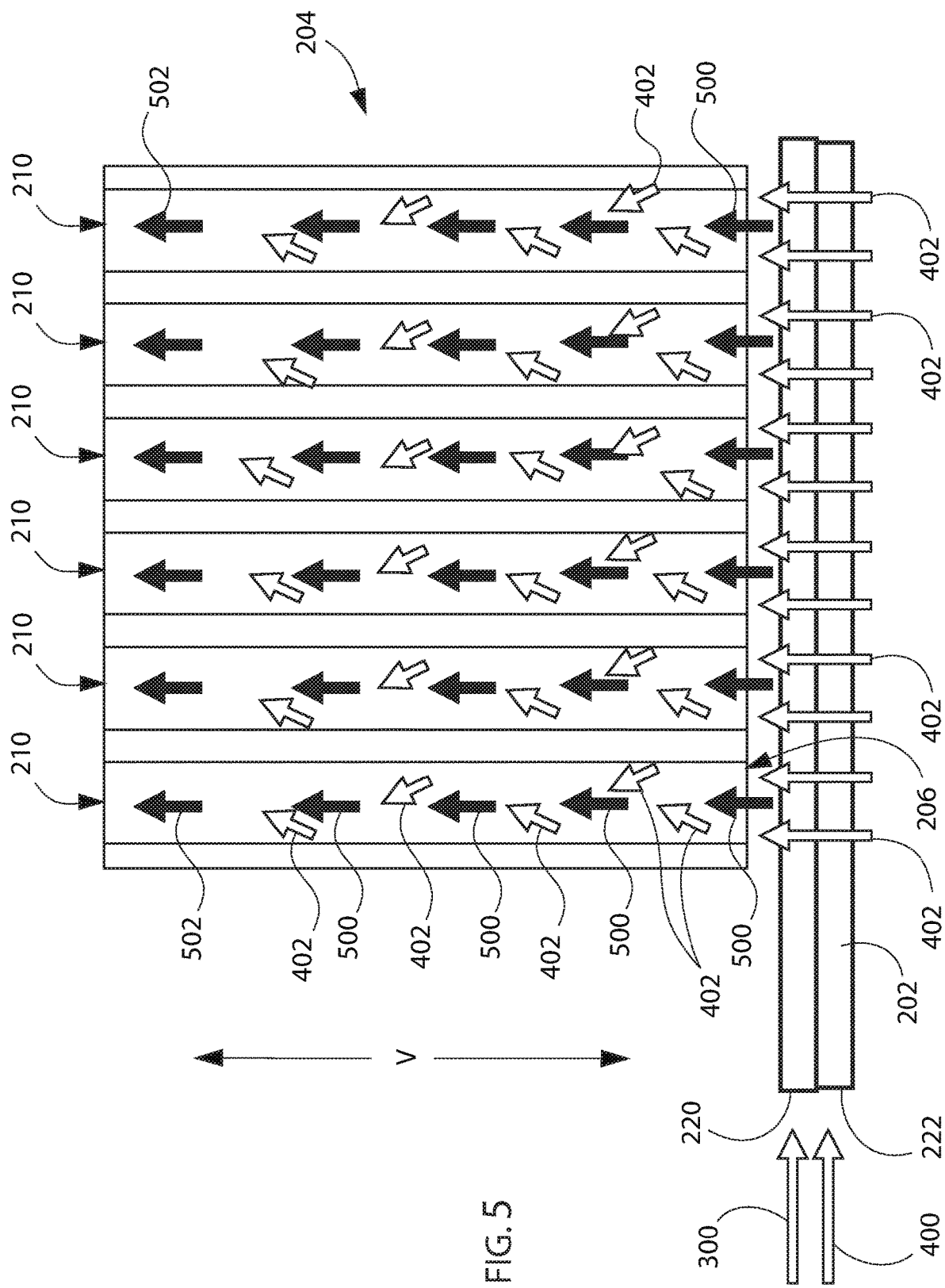
FIG. 5 provides a schematic view of exemplary fluid flow patterns through the burner and the tubular combustion chamber of FIG. 4.

As may be seen in FIGS. 3 through 5, the burner 202 may be positioned proximate the inlet 206 of the tubular combustion chamber 204. For example, the burner 202 may be positioned below the inlet 206 of the tubular combustion chamber 204 along the vertical direction V. Accordingly, the burner 202 may be in thermal communication with the tubular combustion chamber 204, whereby combustion products 500, e.g., flames and hot gases, etc., emanating from the burner 202 may enter the tubular combustion chamber 204 at the inlet 206 of the tubular combustion chamber 204. For example, with the burner 202 below the inlet 206 of the tubular combustion chamber 204, the hot combustion products 500 (FIG. 5) may rise due to natural convection and enter the inlet 206 of the tubular combustion chamber 204.

As may be seen in FIGS. 4 and 5, the tubular combustion chamber 204 may include a plurality of parallel tubes 214 (FIG. 5) each extending from an inlet 206 to an outlet 210. For example, in the illustrated embodiment, six tubes 214 are provided. In other embodiments, the tubular combustion chamber 204 may include any suitable number of tubes 214, such as a single tube 214 extending over the entire lateral dimension of the combustion chamber 204, two or three tubes 214, or more than six tubes 214. In embodiments where a plurality of tubes 214 are provided, the plurality of inlets 206 of the plurality of tubes 214 may collectively define the inlet 206 of the tubular combustion chamber 204 and the plurality of outlets 210 of the plurality of tubes 214 may collectively define the outlet 210 of the tubular combustion chamber 204. For example, the plurality of inlets 206 of the plurality of parallel tubes 214 may be aligned along the vertical direction V, aligned along the transverse direction T, and spaced apart along the lateral direction L. Similarly, the plurality of outlets 210 of the plurality of parallel tubes 214 may be aligned along the vertical direction V, aligned along the transverse direction T, and spaced apart along the lateral direction L.

The tube or tubes of the combustion chamber 204 may have any suitable cross-sectional shape, e.g., circular, oval, rectangular, or any other polygonal or non-polygonal shape. In some embodiments, each tube of the plurality of parallel tubes may have a rectangular cross-section. In some embodiments, the rectangular cross-section may be generally square. In other embodiments, a length of the cross-section of each tube 214 along the lateral direction L may be greater than a width of the cross-section of each tube 214 along the transverse direction T. Further, the cross-section of one or more tubes 214 of the plurality of parallel tubes 214 may differ from the cross-section of the remaining tubes 214 of the plurality of parallel tubes 214. For example, some tubes 214 may be smaller than other tubes 214, and/or some tubes 214 may be square while other tubes 214 have a width greater than a length, etc.

In some embodiments, the tubular combustion chamber 204 may comprise a metallic material, such as steel. The rectangular cross-section of each tube 214 of the plurality of parallel tubes 214 may provide structural stability to the tubular combustion chamber 204. For example, the rectangular cross-section of the tubes may provide resistance to thermal expansion of the material, e.g., steel, of the tubular combustion chamber 204 due to the heat of the combustion products 500. Structural stability of the tubular combustion chamber 204 may also be provided by webs 216 (FIG. 4) between adjacent tubes 214 of the combustion chamber 204. As illustrated in FIG. 4, each web 216 may extend fully between each tube 214 of the pair of adjacent tubes 214 along the lateral direction L and may be coextensive with one or both tubes 214 of the pair of adjacent tubes 214 along the vertical direction V.

The tube 214, or each tube 214 of the plurality of tubes 214, of the tubular combustion chamber 204 may include a front wall 224, e.g., positioned closest to and facing towards the front portion 107 and the door 106 of the oven appliance 100, and an opposing back wall 230 positioned opposite of and facing away from the front wall 224. For example, as seen in FIG. 3, the front wall(s) 224 and the back wall(s) 230 of the tubular combustion chamber 204 may be spaced apart along the transverse direction T. In the body portion 208 of the tubular combustion chamber 204, the front wall(s) 224 and the back wall(s) 230 may be generally parallel to each other and may extend generally along the vertical direction V. As may be seen in FIG. 4, the or each tube 214 may further include a first side wall 226 and a second side wall 228 which are spaced apart along the lateral direction L. The first side wall 226 and the second side wall 228 may be generally parallel to each other, at least in the body portion 208 of the tubular combustion chamber 204. The walls 224, 226, 228, and 230 may collectively enclose and define an internal volume 232 of the tube 214 and/or the tubular combustion chamber 204. As illustrated in FIG. 5 and described in more detail below, the internal volume 232 may provide a mixing passage for combustion products 500 and secondary air 402.

In some embodiments, the inlet 206 of the tubular combustion chamber 204 may include a flared section. For example, as seen in FIG. 3, the front wall 224 and the back wall 230 may diverge from one another at the inlet 206. For example, the portion of the front wall 224 and the portion of the back wall 230 that define the inlet 206 may be oblique to the vertical direction V and an internal cross-sectional area of the tubular combustion chamber 204 may increase moving downward along the vertical direction V from the main body portion 208 towards the inlet 206.

In some embodiments, as best seen in FIG. 3, the burner 202 may define a width along the transverse direction T, the inlet 206 of the tubular combustion chamber 204 may define a width along the transverse direction T, and the width of the inlet 206 may be greater than the width of the burner 202.

In some embodiments, the outlet 210 of the tubular combustion chamber 204 may be oblique to the body portion 208. As mentioned, the tubular combustion chamber 204 may extend generally along the vertical direction V from the inlet 206 to the outlet 210, and the body portion 208 may be oriented generally along the vertical direction V. As illustrated for example in FIGS. 2 and 3, the combustion heating assembly 140, including the housing 200 and tubular combustion chamber 204 thereof, may be positioned proximate the back portion 109 of the cabinet 102, and the outlet 210 of the tubular combustion chamber 204 may be oriented towards the front portion 107 of the cabinet 102 along the transverse direction T and oriented towards the top portion 132 of the cabinet 102 along the vertical direction V.

As illustrated in particular in FIG. 5, the burner 202 may include a fuel inlet 220 that receives a flow of fuel 300 and an air inlet 222 that receives a flow of primary air 400. The inlets 220 and 222 of the burner 202 may be any suitable port or fitting as will be understood by those of skill in the art. The structure and function of such fittings are not described or illustrated in further detail herein for the sake of clarity and brevity. The fuel 300 may be any suitable fluid fuel, such as a gaseous fuel including natural gas or propane.

The fuel 300 and the primary air 400 may mix within the burner 202 and may be ignited by an ignition source such as a spark plug or pilot flame to create combustion products 500. The combustion products 500, e.g., flame, may emanate upwards along the vertical direction V from the burner 202 through outlets 218 (FIG. 4) in a top of the burner 202.

As best seen in FIGS. 3 and 5, the burner 202 may be spaced from the inlet 206 of the tubular combustion chamber 204, e.g., along the vertical direction V. As illustrated in FIG. 5, such spacing may provide for secondary air 402 to be entrained into the inlet 206 of the tubular combustion chamber 204, such as into the inlets 206 of each tube of the plurality of parallel tubes as in the illustrated embodiment. The secondary air 402 may be drawn into and through the tubular combustion chamber 204 by the combustion products 500 from the burner 202, e.g., due to chimney effect. As shown in FIG. 5, the secondary air 402 may mix with the combustion products 500 within the tubular combustion chamber 204. Such mixing may include a combined effect of oxygen from the secondary air with heat and unburned fuel in the combustion products 500, resulting in more complete combustion of the fuel 300 and thereby providing cleaner combustion gas 502 at the outlet 210 of the tubular combustion chamber 204. For example, the combustion gas 502 may contain a smaller portion of combustion byproducts or residual unburned fuel 300 as compared to the combustion products 500 originating at the outlets 218 of the burner 202. As a result of flowing the combustion products 500 through the tubular combustion chamber 204 and mixing the combustion products 500 with the secondary air 402 therein, the overall efficiency and performance of the combustion heating assembly 140 is improved as compared to using a burner 202 without the tubular combustion chamber 204.

As mentioned above, the tubular combustion chamber 204 provides at least one flow path therethrough for the combustion products 500 and the secondary air 402. For example, the tubular combustion chamber 204 may comprise a single tube 214 fully encompassing the combustion chamber 204 and providing a single flow path through the internal volume 232, or may include multiple, e.g., six, tubes 214 each defining a flow path therethrough. The flow path(s) may advantageously be sufficiently long (in the vertical direction V, as may be seen, e.g., in FIGS. 4 and 5) to promote mixing of the combustion products 500 and secondary air 402 as the combustion products 500 and secondary air 402 travel through the combustion chamber 204. For example, the vertical dimension of the combustion chamber 204 may be about ten times greater than at least one of the transverse dimension and the lateral dimension of the combustion chamber 204. In the illustrated embodiment, the vertical dimension of the combustion chamber 204 and/or of each tube 214 is about ten times the lateral dimension and the transverse dimension of each tube 214.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical direction, a lateral direction and a transverse direction, the vertical, lateral and transverse directions being mutually perpendicular, the oven appliance comprising:
   a cabinet extending between a front portion and a back portion along the transverse direction, the cabinet also extending between a first side portion and a second side portion along the lateral direction and between a top portion and a bottom portion along the vertical direction, the cabinet defining a cooking chamber configured for receipt of food items for cooking;
   a door rotatably mounted to the cabinet, whereby the door is rotatable between an open position to access the cooking chamber and a closed position where the door encloses the cooking chamber;
   a tubular combustion chamber extending from an inlet to an outlet, the outlet of the tubular combustion chamber in thermal communication with the cooking chamber to provide combustion gas from the tubular combustion chamber to the cooking chamber;
   a burner positioned proximate the inlet of the tubular combustion chamber and in thermal communication with the tubular combustion chamber whereby combustion products from the burner enter the tubular combustion chamber at the inlet, wherein the burner is spaced from the inlet of the tubular combustion chamber whereby secondary air is entrained into the inlet of the tubular combustion chamber and drawn through the tubular combustion chamber by the combustion products from the burner; and
   a housing positioned within the cooking chamber, the housing comprising a back wall and a front wall opposite the back wall of the housing along the transverse direction, the front wall of the housing spaced apart from the door along the transverse direction, the back wall of the housing in contact with a back wall of the cooking chamber, the burner entirely enclosed by and between the back wall of the housing and the front wall of the housing and above a bottom wall of the housing, and the tubular combustion chamber at least partially enclosed within the housing by the front wall of the housing and the back wall of the housing.

2. The oven appliance of claim 1, wherein the housing comprises an inlet in fluid communication with an ambient environment outside the oven appliance, wherein the secondary air is ambient air from outside the oven appliance.

3. The oven appliance of claim 1, wherein the tubular combustion chamber comprises a plurality of parallel tubes each extending from an inlet to an outlet, the plurality of inlets of the plurality of tubes collectively defining the inlet of the tubular combustion chamber and the plurality of outlets of the plurality of tubes collectively defining the outlet of the tubular combustion chamber.

4. The oven appliance of claim 3, wherein each tube of the plurality of parallel tubes comprises a rectangular cross-section.

5. The oven appliance of claim 3, wherein the plurality of inlets of the plurality of parallel tubes are aligned along the vertical direction, aligned along the transverse direction, and spaced apart along the lateral direction.

6. The oven appliance of claim 1, wherein the inlet of the tubular combustion chamber comprises a flared section.

7. The oven appliance of claim 1, wherein the tubular combustion chamber comprises a body portion between the inlet and the outlet, and wherein the outlet of the combustion chamber is oblique to the body portion.

8. The oven appliance of claim 7, wherein the tubular combustion chamber is positioned proximate the back portion of the cabinet, and the outlet of the tubular combustion chamber is oriented towards the front portion of the cabinet along the transverse direction and oriented towards the top portion of the cabinet along the vertical direction.

9. The oven appliance of claim 1, wherein the tubular combustion chamber extends from the inlet to the outlet along the vertical direction.

10. The oven appliance of claim 1, wherein the burner is spaced from the inlet of the tubular combustion chamber along the vertical direction, wherein the burner defines a width along the transverse direction, and wherein the inlet of the tubular combustion chamber defines a width along the transverse direction, the width of the inlet being greater than the width of the burner.

11. The oven appliance of claim 1, wherein the burner and the tubular combustion chamber are positioned proximate the top portion of the cabinet and proximate the back portion of the cabinet.

12. An oven appliance, comprising:
   a cabinet extending vertically between a top portion and a bottom portion, the cabinet defining a cooking chamber configured for receipt of food items for cooking;
   a door rotatably mounted to the cabinet, whereby the door is rotatable between an open position to access the cooking chamber and a closed position where the door encloses the cooking chamber;
   a tubular combustion chamber extending from an inlet to an outlet, the outlet of the tubular combustion chamber in thermal communication with the cooking chamber to provide combustion gas from the tubular combustion chamber to the cooking chamber;
   a burner in fluid communication with the tubular combustion chamber via the inlet of the tubular combustion chamber, wherein combustion products from the burner mix with secondary air within the tubular combustion chamber to produce the combustion gas; and a housing positioned within the cooking chamber, the housing comprising a back wall and a front wall opposite the back wall of the housing along the transverse direction, the front wall of the housing spaced apart from the door along the transverse direction, the back wall of the housing in contact with a back wall of the cooking chamber, the burner entirely enclosed by and between the back wall of the housing and the front wall of the housing and above a bottom wall of the housing, and the tubular combustion chamber at least partially enclosed within the housing by the front wall of the housing and the back wall of the housing.

13. The oven appliance of claim 12, wherein the housing comprises an inlet in fluid communication with an ambient environment outside the oven appliance, wherein the secondary air is ambient air from outside the oven appliance.

14. The oven appliance of claim 12, wherein the tubular combustion chamber comprises a plurality of parallel tubes each extending from an inlet to an outlet, the plurality of inlets of the plurality of tubes collectively defining the inlet of the tubular combustion chamber and the plurality of outlets of the plurality of tubes collectively defining the outlet of the tubular combustion chamber.

15. The oven appliance of claim 14, wherein each tube of the plurality of parallel tubes comprises a rectangular cross-section.

16. The oven appliance of claim 12, wherein the inlet of the tubular combustion chamber comprises a flared section.

17. The oven appliance of claim 12, wherein the tubular combustion chamber comprises a body portion between the inlet and the outlet, and wherein the outlet of the combustion chamber is oblique to the body portion.

18. The oven appliance of claim 12, wherein the tubular combustion chamber extends vertically from the inlet to the outlet.

19. The oven appliance of claim 2, further comprising a duct extending through the cabinet from a vent in the cabinet to the inlet in the housing, whereby the ambient air from outside the oven appliance is provided by the duct.

20. The oven appliance of claim 13, further comprising a duct extending through the cabinet from a vent in the cabinet to the inlet in the housing, whereby the ambient air from outside the oven appliance is provided by the duct.

* * * * *